(12) United States Patent
Wiatrowski et al.

(10) Patent No.: US 9,232,382 B2
(45) Date of Patent: Jan. 5, 2016

(54) METHOD AND APPARATUS FOR AUTOMATICALLY DETERMINING A COMMUNICATION RANGE STATUS OF COMMUNICATING RADIOS

(75) Inventors: David G. Wiatrowski, Woodstock, IL (US); Yueh Ching Chung, Pul (MY); Teik Choon Teh, Per (MY)

(73) Assignee: Motorola Solutions, Inc., Schaumburg, IL (US)

( * ) Notice: Subject to any disclaimer, the term of this patent is extended or adjusted under 35 U.S.C. 154(b) by 850 days.

(21) Appl. No.: 13/485,148

(22) Filed: May 31, 2012

(65) Prior Publication Data
US 2013/0324177 A1    Dec. 5, 2013

(51) Int. Cl.
*H04W 24/00*   (2009.01)
*H04W 56/00*   (2009.01)
*H04W 8/00*    (2009.01)

(52) U.S. Cl.
CPC ...................... *H04W 8/005* (2013.01)

(58) Field of Classification Search
CPC . H04W 76/005; H04W 76/023; H04W 8/005; H04W 36/30; H04W 4/08; H04W 72/0406; H04W 74/06; H04W 74/0891; H04W 76/04; H04W 76/045
See application file for complete search history.

(56) References Cited

U.S. PATENT DOCUMENTS

| | | | |
|---|---|---|---|
| 4,924,462 A * | 5/1990 | Sojka | 370/449 |
| 5,032,835 A | 7/1991 | Deluca | |
| 5,327,578 A | 7/1994 | Breeden et al. | |
| 5,365,512 A | 11/1994 | Combs et al. | |
| 5,373,548 A | 12/1994 | McCarthy | |
| 5,677,909 A * | 10/1997 | Heide | 370/347 |
| 5,867,782 A | 2/1999 | Yoon | |
| 5,995,500 A | 11/1999 | Ma et al. | |
| 6,097,707 A | 8/2000 | Hodzic et al. | |
| 6,128,483 A | 10/2000 | Doiron et al. | |
| 7,084,740 B2 | 8/2006 | Bridgelall | |
| 7,263,379 B1 | 8/2007 | Parkulo et al. | |
| 7,599,324 B2 | 10/2009 | Luebke et al. | |
| 7,801,516 B2 | 9/2010 | Saito | |

(Continued)

FOREIGN PATENT DOCUMENTS

EP    1770903 A1    4/2007

OTHER PUBLICATIONS

Vertex Standard; Auto-Range Transpond System (ARTS) Fact Sheet; Dec. 2009, 2 Pages; vertexstandard.com.
International Search Report for counterpart International Patent Application No. PCT/US2013/040036, mailed on Nov. 20, 2013.
International Search Report and Written Opinion for related counterpart International Patent Application No. PCT/US2013/040589, mailed on Nov. 18, 2013.
Non Final Office Action mailed on Jan. 13, 2014 in related U.S. Appl. No. 13/485,125, Dipendra M. Chowdhary, filed May 31, 2012.

(Continued)

*Primary Examiner* — Fanghwa Wang
(74) *Attorney, Agent, or Firm* — Barbara R. Doutre

(57) ABSTRACT

A method is disclosed for determining a connectivity status of radios in a coverage group. Each coverage group includes radios configured to transmit and receive range messages on a channel and a timeslot. Each radio in the coverage group is configured to generate a range message and to transmit the range message to each other radio in the coverage group. Each radio in the coverage group is also configured to receive, from each other radio in the coverage group, a range message generated by each other radio. Based on the range message received from each other radio, each radio is configured to determine bi-directional connectivity between the receiving radio and the radios that sent the D-ARTS messages. The determined bi-directional connectivity status is between each radio and each of at least two other radios in the coverage group.

17 Claims, 6 Drawing Sheets

(56) References Cited

U.S. PATENT DOCUMENTS

| | | |
|---|---|---|
| 8,040,277 B2 | 10/2011 | Dicke |
| 2001/0051529 A1 | 12/2001 | Davies |
| 2001/0055356 A1 | 12/2001 | Davies |
| 2002/0080820 A1* | 6/2002 | Hashem et al. ............... 370/471 |
| 2002/0093928 A1 | 7/2002 | LoGalbo et al. |
| 2003/0129969 A1* | 7/2003 | Rucinski ....................... 455/412 |
| 2003/0227934 A1 | 12/2003 | White et al. |
| 2006/0067222 A1 | 3/2006 | Endoh |
| 2010/0080157 A1 | 4/2010 | Stewart |
| 2010/0254392 A1* | 10/2010 | Katar et al. ................... 370/400 |
| 2011/0274070 A1* | 11/2011 | Xia et al. ...................... 370/329 |
| 2013/0322414 A1 | 12/2013 | Chowdhary et al. |

OTHER PUBLICATIONS

Speakman, T., "PGM Reliable Transport Protocol Specification," Network Working Group, RFC 3208, Dec. 2001.

Corresponding International Application PCT/US2013/040036—International Preliminary Report on Patentability dated Dec. 2, 2014.

"Vertex Standard Demo: Auto-Range Transpond System (ARTS) and ARTS II", dated Apr. 18, 2011. URL: http://www.youtube.com/watch?v=63nkvq4Thws.

International Preliminary Report on Patentability PCT/US2013/040589 dated Dec. 2, 2014.

\* cited by examiner

| 0 | LB | PF | CSBKO | | | | |
|---|---|---|---|---|---|---|---|
| 1 | FID | | | | | | |
| 2 | FL | | S | R | SOURCE $b_9$-$b_6$ | | |
| 3 | SOURCE $b_5$-$b_0$ | | | | | S0 STAT | S1 STAT |
| 4 | S2 STAT | S3 STAT | S4 STAT | S5 STAT | S6 STAT | S7 STAT | S8 STAT | S9 STAT |
| 5 | S10 STAT | S11 STAT | S12 STAT | S13 STAT | S14 STAT | S15 STAT | S16 STAT | S17 STAT |
| 6 | S18 STAT | S19 STAT | S20 STAT | S21 STAT | S22 STAT | S23 STAT | S24 STAT | S25 STAT |
| 7 | S26 STAT | S27 STAT | S28 STAT | S29 STAT | S30 STAT | S31 STAT | S32 STAT | S33 STAT |
| 8 | S34 STAT | S35 STAT | S36 STAT | S37 STAT | S38 STAT | S39 STAT | S40 STAT | S41 STAT |
| 9 | S42 STAT | S43 STAT | S44 STAT | S45 STAT | S46 STAT | S47 STAT | S48 STAT | S49 STAT |
| 10 | CRC-CCITT | | | | | | |
| 11 | | | | | | | |

D-ARTS MESSAGE 200

*FIG. 2*

| FUND GROUP SIZE= | | 20 |
|---|---|---|
| COVERAGE GROUP | SOURCE ID (LOW) | SOURCE ID (HIGH) |
| 0 | 0 | 19 |
| 1 | 20 | 39 |
| 2 | 40 | 59 |
| 3 | 60 | 79 |
| 4 | 80 | 99 |
| ... | | |
| 49 | 980 | 999 |
| 50 | 1000 | 1019 |

*FIG. 3*

| SOURCE (10-BITS) | | | |
|---|---|---|---|
| MODE $b_9$-$b_6$ | COVERAGE GROUP | SU INDEX | DESCRIPTION |
| 000 | 0-BITS | 7-BITS | 1 GROUP OF 128 RADIOS |
| 001 | 1-BIT | 6-BITS | 2 GROUP OF 64 RADIOS |
| 010 | 2-BITS | 5-BITS | 4 GROUPS OF 32 RADIOS |
| 011 | 3-BITS | 4-BITS | 8 GROUPS OF 16 RADIOS |
| 100 | 4-BITS | 3-BITS | 16 GROUPS OF 8 RADIOS |
| 101 | 5-BITS | 2-BITS | 32 GROUPS OF 4 RADIOS |
| 110 | 6-BITS | 1-BIT | RESERVED (64 GROUPS OF 2 RADIOS) |
| 111 | 7-BITS | 0-BITS | RESERVED (128 GROUPS OF 1 RADIO) |

*FIG. 4*

| 2 GROUPS OF 64 RADIOS | | | | | |
|---|---|---|---|---|---|
| GRP | LO-HEX | HI-HEX | LO-DEC | HI-DEC | # SU |
| 0 | 080 | 0BF | 128 | 191 | 64 |
| 1 | 0C0 | 0FF | 192 | 255 | 64 |

*FIG. 5*

| 4 GROUPS OF 32 RADIOS | | | | | |
|---|---|---|---|---|---|
| GRP | LO-HEX | HI-HEX | LO-DEC | HI-DEC | # SU |
| 0 | 100 | 11F | 256 | 287 | 32 |
| 1 | 120 | 13F | 288 | 319 | 32 |
| 2 | 140 | 15F | 320 | 351 | 32 |
| 3 | 160 | 17F | 352 | 383 | 32 |

*FIG. 6*

METHOD AND APPARATUS FOR AUTOMATICALLY DETERMINING A COMMUNICATION RANGE STATUS OF COMMUNICATING RADIOS

FIELD OF THE DISCLOSURE

The present disclosure relates to automatically determining a communication range status of communicating radios.

BACKGROUND

Private/professional radios, such as mobile radios, portable radios, and the like, may be configured to communicate (send information to and receive information from) with each other in direct mode or in repeater mode. In direct mode, radios communicate directly with one another. In repeater mode, radios communicate with one another through a repeater, wherein information is sent from a transmitting radio through the repeater to one or more receiving radios. Radios may also communicate through a dispatcher (dispatch center) that may be connected directly to a repeater via a wireline link or that may be connected to a control station (a mobile radio mounted to a desk or a rack) via a wireline link. Dispatchers are typically stationary. Each radio in communication with another radio and/or the dispatcher, either in direct mode or repeater mode, may need to be configured to alert its user when it is out of communication range from the other radio(s) with which it was previously able to communicate, or when it is out of communication range from the dispatcher. The dispatcher also may need to know when a radio is out of communication range. Accordingly, each radio that communicates with other radios through a dispatcher has to keep track of the dispatcher; the dispatcher has to keep track of each radio for which it facilitates communications; and each radio in direct communications with other radios needs to track the other radios in its direct communications range.

The following examples provide scenarios of when a radio in communication with other radios and/or the dispatcher, either in direct mode or repeater mode, needs to alert its user when it is out of communication range from the other radios and/or the dispatcher with which it was previously able to communicate. Consider an example where, as a security precaution, radios used by drivers in a fleet of armored trucks need to be in communication with each other and/or with a dispatcher at all times, either in direct mode or repeater mode. Should an incident occur that would place a first radio out of the communication range of one or more radios in the fleet of armored trucks and/or dispatcher, the dispatcher and/or the users of the other radio(s) need to be notified that the first radio has moved out of communication range. Additionally or alternatively, the first radio may need to alert its user that the first radio can no longer communicate with one or more radios in the group. In another example, to make it easier and more efficient for remote workers to remain in hassle-free contact with other remote workers, radios used by each remote worker may be configured to remain in contact with a base operation. Thus, each radio in such a configuration may be set up to notify its user when the radio moves out of communication range from the base operation. In another example, a group can be configured so that a leader can determine the status of group members by monitoring when radios used by group members move out of the leader radio's communication range.

In a conventional Auto-Range Transpond System (ARTS), when a group of radios are configured to directly communicate with each other or when the group of radios are configured to communicate through a dispatcher, each radio periodically transmits an unconfirmed "beacon" to the other radios in the group or to the dispatcher. An unconfirmed beacon is a one-way transmission with no feedback provided to the sending radio as to whether the entire message is received without uncorrectable errors. The beacon is a push-to-talk identifier associated with a transmitting radio that announces the transmitting radio's presence to other radio(s) and/or the dispatcher within the transmitting radio's communication range. Just because a receiving radio is able to receive a signal from a transmitting radio, this does not imply that the receiving radio is able to transmit information to the transmitting radio. Consider the following example where a portable radio with a lower transmitter power is able to receive a beacon sent from a mobile radio with a higher transmitter power. Radios with lower transmitter power typically have a transmit range that is more limited than the transmit range of radios with higher transmitter power. Therefore, if a radio with a lower transmitter power, in this case the portable radio, can receive a signal from a radio with a higher transmitter power, in this example the mobile radio, this does not imply that the portable radio with the lower transmitter power is also able to send information to the mobile radio with the higher transmitter power. Because the transmitted beacon is unconfirmed and no response is required or provided in ARTS, even when the portable radio can only receive information from the mobile radio, but cannot send information to the mobile radio because of the portable radio's lower transmitter power, the mobile radio and the portable radio may erroneously determine their communication status with respect to each other. The portable radio may correctly conclude that it is capable of receiving from the mobile radio, but may incorrectly conclude that it is capable of transmitting to the mobile radio. Conversely, the mobile radio may correctly conclude that it is not capable of receiving from the portable radio, but may incorrectly conclude that it is not capable of transmitting to the portable radio.

In addition, ARTS does not provide an avenue for a radio to proactively provide a bi-directional communication range status information of other radios and/or the dispatcher. ARTS also does not provide an avenue for a radio to alert its user when it can no longer transmit information to another radio before the user presses a switch, such as a push-to-talk button.

Furthermore, ARTS only operates in analog mode. Radios may operate in different modes, for example, analog or digital mode; direct, talkaround, or repeater mode; conventional or trunked mode. Accordingly, each radio needs to support different modes of operation. Although radios currently operating in trunked systems and multi-site systems may provide an "out-of-range" (OOR) indication to users to indicate that the radio is unable to receive information from a system infrastructure, the OOR indication does not provide an indication that a target radio is within communication range, does not provide a proactive indication when the radio is unable to transmit into the system, and the OOR indication is not present in direct/talkaround or single site conventional operating modes.

In one implementation, ARTS radios can transmit their beacons as frequently as every twenty (25) seconds and an ARTS beacon transmission is approximately five hundred (500) milliseconds (msec) in duration. Assuming that transmissions are perfectly scheduled for maximum utilization of a channel, this would imply that ARTS is capable of supporting approximately fifty (50) radios on an access channel. However, due to the random access nature of the channel on which radios transmit their beacons, transmissions are not typically perfectly scheduled. Therefore, ARTS is typically capable of supporting about ten (10) to fifteen (15) radios at a time. A system capable of supporting more radios is desirable.

Some radios currently include a user-initiated radio check feature that operates in a one-to-one mode, wherein a first radio queries a second radio to determine the second radio's presence. When the first radio receives a response to a query sent to the second radio, the first radio can conclude that its query was successfully transmitted to the second radio because the second radio's response was successfully received (bi-directional capability). The radio check feature therefore allows the first radio to check for bi-directional connectivity with the second radio. In other words, the radio check feature allows the first radio to determine that it can both transmit information to and receive information from the second radio. The radio check feature in conjunction with a provisioned list of radios could be modified to operate periodically and automatically. However, a single radio check transaction (between a pair of radios) on, for example, an European Telecommunications Standards Institute-Digital Mobile Radio (ETSI-DMR) channel consumes approximately six hundred (600) msec of time on the channel. The 600 msec may include, for example, channel access rules (approximately 180 msec), battery saver preambles (approximately 120 msec), the radio check control block signaling (CSBK) (approximately 60 msec), a delay through a repeater (approximately 60 msec), processing latency in the target radio (approximately 60 msec), a response from the target radio (approximately 60 msec), and another delay through the repeater (approximately 60 msec). Because radio check is fundamentally a one-to-one feature, as the number of radios in a system grows, the number of radio check operations performed in the system can be expected to grow exponentially. A high number of radio check operations may degrade the random access channels on which radios transmit their signal. Random access channel degradation and the likely forced spacing required between messages on a random access channel so that the channel can also transmit actual payload data may limit the number of radio check operations performed on the system.

In cases where radios communicate with each other and/or a dispatcher through a repeater, some radios currently include a channel access feature that permits a high speed handshake (e.g., request and grant) between a radio and the intermediary repeater. When setting up a group call, there is typically one transmitter radio and multiple receiver radios. If each receiver radio provided a response to the high speed handshake, this would result in chaos on the channel with the multiple responses possibly colliding with one another and would be inefficient. Having a repeater, when present, provide the response to the transmitting radio is more efficient. The high speed handshake between the transmitting radio and the repeater, therefore, mitigates any channel access collisions as well as confirms that the transmitting radio has in fact accessed the repeater before it commences with a voice or data transmission. Because this feature only allows handshakes with the repeater, not target radio(s), there is no confirmation of end-to-end connectivity between the transmitting radio and the target radio(s), prior to the transmitting radio starting a call. In addition, because the high speed handshake is only with the repeater, this approach cannot be used in a direct/talkaround mode. Furthermore, this feature provides information reactively, not proactively, i.e., the transmitting radio does not know any communication range status until a call is attempted.

Accordingly, there is a need for a method and apparatus for automatically and proactively determining the communication range status of communicating radios.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 2 is a block diagram of a digital Auto-Range Transpond System (D-ARTS) message used in accordance with some embodiments.

FIG. 3 is a block diagram of a fundamental group size assigned to coverage groups in accordance to some embodiments.

FIG. 4 is a block diagram of how the three most significant bits is used in the D-ARTS message in accordance to some embodiments.

FIG. 5 is a block diagram of identifier ranges used in each coverage group in accordance with some embodiments.

FIG. 6 is a block diagram of identifier ranges used in each group in accordance with some embodiments.

Figure 1:
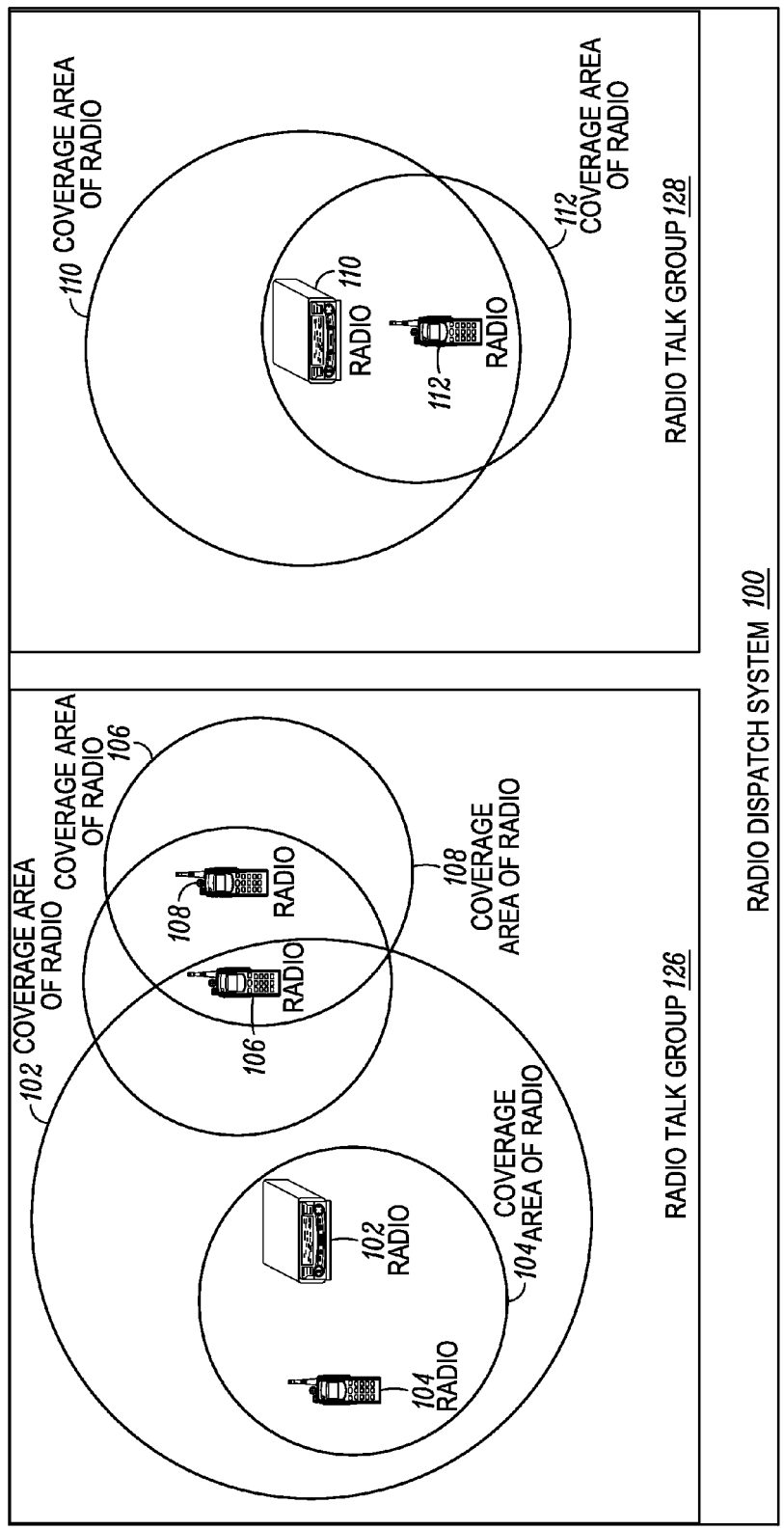
FIG. 1 is a block diagram of a radio dispatch system used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some embodiments are directed to apparatuses and methods for determining a connectivity status of radios in a coverage group. Each coverage group includes radios configured to transmit and receive range messages on a channel and a timeslot. Multiple coverage groups may operate on the same channel and timeslot. Each radio in the coverage group is configured to generate a range message and to transmit the range message to each other radio in the coverage group. The range message may be a "broadcast", "multicast", or "group call". Each radio in the coverage group is also configured to receive, from each other radio in the coverage group, a range message generated by each other radio. Based on the range messages received from each other radio, each radio is configured to determine bi-directional connectivity between the receiving radio and the radios that sent the D-ARTS messages. The determined bi-directional connectivity status is between each radio and each of at least two other radios in the coverage group.

FIG. 1 is a block diagram of a radio dispatch system used in accordance with some embodiments. Radio dispatch system 100 includes one or more operating radios 102-112 in different talk groups 126 and 128. Radios may communicate (send information to and receive information from) with each other in direct mode or in repeater mode. Radios 102-112 may be, for example, portable two-way radios, mobile radios, or dispatcher/dispatcher centers that can be connected directly to repeater (not shown) or to a control station (not shown). Each radio user or dispatcher may receive, monitor, and/or transmit information to one or more of operating radios 102-112 in the same talk group.

Radios 102-108 are part of radio talk group 126 and each radio 102-108 is provisioned with a coverage group list. The coverage group list identifies those radios whose connection status each radio 102-108 must track. For example, using the coverage group list, radio 102 may determine whether one or more of radios 104-108 is "present" or "absent", i.e., whether one or more of radios 104-108 is in radio 102 communication range or outside of radio 102 communication range. In an embodiment, radios 102-108 are each configured to transmit a digital Auto-Range Transpond System (D-ARTS) message to other radios in its coverage group. The D-ARTS message serves as a beacon that announces a radio's presence (so that other radios, for example radios 104-108, can know that they can receive information from, for example, radio 102 when radio 102 transmits a D-ARTS message). The D-ARTS message also serves as a response or acknowledgment (so that, for example radio 102, can indicate its ability to receive information from, for example, radios 104-108). The D-ARTS message may be a broadcast or multicast message or group call to the other radios in the coverage group.

In an embodiment, each radio 102-108 transmits one D-ARTS message per polling interval, wherein each D-ARTS message provides an indication of other radios that can successfully transmit information to the radio sending the D-ARTS message. In other words, each radio receiving D-ARTS messages from other radios in the coverage group can interpret the received D-ARTS messages to determine bi-directional connectivity between the receiving radio and the radios that sent the D-ARTS messages. Therefore, in a system using the D-ARTS message instead of two radio check-and-response message pairs for every pair of radios in the coverage group list (wherein each radio in the pair transmits one radio check and one response as is done with radios implementing the radio check feature), only one D-ARTs message is transmitted per polling interval for each radio in the coverage group list. The D-ARTs message combines the radio check and response functions so that the system using the D-ARTS message does not have the exponential messaging problem associated with a system implementing the radio check feature. After each radio receiving D-ARTS messages from other radios in the coverage group interprets the received D-ARTS messages to determine bi-directional connectivity between the receiving radio and the radios that sent the D-ARTS messages, the receiving radio may produce an alert when another radio in the coverage group is determined by the receiving radio to be out of communication range with the receiving radio according to the bi-directional connectivity status between the receiving radio and the other radio.

FIG. 2 is a block diagram of a D-ARTS message used in accordance with some embodiments. Source ($b_x$) fields in octets 2 and 3 of D-ARTS message 200 identify a transmitting radio and serve as the transmitting radio's "beacon". Bitmasks ($S_x$) fields in octets 3 through 9 of D-ARTS message 200 indicate the other radios in the coverage group that can transmit information to the radio sending D-ARTS message 200, wherein D-ARTS message 200 includes a bitmask indication to identify each other radio's transmission status in the coverage group, as viewed by the radio generating the D-ARTS message 200. A bit number in D-ARTS message 200 corresponds to each radio's indexed position in the coverage group list. If, for example, radio 102 is transmitting D-ARTS message 200, and radio 102 has received a beacon from radio 108 during the most recent polling interval, then the $S_x$ field associated with radio 108, in the D-ARTS message 200 transmitted by radio 102, may be marked as "present"; otherwise, the $S_x$ field associated with radio 108 may be marked as "absent". In some embodiments, predefined rules may be applied to the $S_x$ field in order to determine how the $S_x$ fields are marked. For example, if radio 102 received a beacon from radio 104 in one or more recent polling intervals offset from the most recent polling interval, the $S_x$ field associated with the radio 104 may be marked as present. If, however, radio 102 did not receive a beacon from radio 104 for a number of recent, consecutive polling intervals, then the $S_x$ field associated with radio 104 may be marked as absent.

In an embodiment, each D-ARTS message 200 may be used to provide status information for up to fifty radios. The first/last (FL) field in octet 2 of D-ARTS message 200 may be used to connect multiple D-ARTS messages 200 together, thus increasing the number of radios that can be associated with a D-ARTS message 200. For example, if the FL field includes "11" value this may be used to indicate that a single burst message is being transmitted, as shown in FIG. 2. If the FL field includes a "10" value, this may be used to indicate that the D-ARTS message is the first burst of a sequence of bursts, if the FL field includes a "01" value, this may be used to indicate that the D-ARTS message is the last burst of a sequence of bursts, and if the FL field includes a "00" value, this may be used to indicate that the D-ARTS message is an intermediate burst of a sequence of bursts. In operation, the time to transmit D-ARTS message 200 on a channel is typically about four hundred and twenty (420) msec in duration, including channel access (approximately 180 msec), battery saver preambles (approximately 120 msec), repeat delay (approximately 60 msec), and D-ARTS CSBK message (approximately 60 msec). Assuming a perfect transmission schedule, the duration for transmitting D-ARTS message 200 on a channel implies that a system using D-ARTS message 200 is able to support up to 71 radios in thirty (30) seconds. However, considering the random access nature of the channel on which D-ARTS message 200 is transmitted and the spacing required to enable user payload, the number of radios that can be supported in the 30 second time frame may be reduced.

To address problems associated with the random access nature of the channel, in an embodiment, each radio may transmit its D-ARTS message 200 during an exclusive, assigned time period or window. In an embodiment, the radio's window number is inferred from its coverage group number and the indexed position of the radio in the coverage group list. The assigned window prevents a D-ARTS message from colliding with other D-ARTS messages transmitted by other radios on the channel, while improving the efficiency and throughput on the channel. Because each radio is assigned to its own exclusive window for transmitting its D-ARTS message 200, it is possible to eliminate idle channel check operations, which may be approximately one hundred and eighty (180) msec long, from the channel access procedure.

To facilitate the startup of a window sequence, D-ARTS message 200 includes a Sync (S) bit in octet 2. When the transmitting radio knows that a D-ARTS message 200 sequence is being transmitted in its proper window (the exclusive transmission window assigned to the radio), the S bit may be set to a predefined value, such as "true". Otherwise, when the window for transmitting the D-ARTS message 200 sequence is unknown, the S-bit may be set to "false". In order to determine a radio's proper transmission window, upon powering up but before knowing the proper window, a radio may set the S-bit in D-ARTS message 200 to "false". After receiving a D-ARTS message 200 with the S-bit set from another radio in the coverage group, the radio determines its window timing and sets the S-bit in its D-ARTS message 200 to "true" for the subsequent D-ARTS message 200 transmission. When the radio receives a D-ARTS message 200 with S-bit set to "true" from another radio in the coverage group with a lower index, the radio transmitting the D-ARTS message 200 follows the window timing associated with lower indexed radio. If the radio does not receive any S-bit with a "true" value, it will increment a counter every time the radio transmits D-ARTS 200 with the S-bit set to "false". When the counter reaches a certain threshold, the radio transmitting the D-ARTS message 200 follows the window timing associated with the last received D-ARTS message 200 with the S-bit set to "true".

Multiple coverage groups may operate on the same channel and timeslot. In one embodiment, a source identifier is assigned to each radio. A fundamental group size or mode for the channel is defined to be at least as large as the size of the largest coverage group operating on a channel. FIG. 3 is a block diagram that identifies the fundamental group size assigned to coverage groups in accordance to some embodiments. Assume that the size of the largest coverage group operating on a channel is fifteen (15). The fundamental group size for the channel, as shown in FIG. 3, may be set to twenty (20) to provide room for future growth. The ID for each coverage group may then be assigned as shown in FIG. 3. Accordingly, by knowing the fundamental group size for a channel, and a radio's assigned indexed position in a coverage group list (e.g., 0 through 19), the Source ID for each radio can be computed. Therefore, the Source ID can be computed as follows:

SourceID=GroupNumber(FundamentalGroupSize)+ Position.

The Source ID (i.e., the 'X' in ($S_x$)) indicates which Bit-masks ($S_x$) field in D-ARTS message 200 is assigned to a particular radio. Similarly, by knowing the Source ID and fundamental group size for the channel, the coverage group(s) and a radio's assigned indexed position in the list can be determined Embodiments may therefore support any arbitrary group size. In an embodiment, the fundamental group size may not be communicated over the air. In embodiments where the fundamental group size is not communicated over the air, the fundamental group size is provisioned identically in all radios to prevent collision of D-ARTS messages 200.

In another embodiment to support multiple coverage groups operating on the same channel and timeslot, the channel and timeslot can be provisioned to operate in one of several modes, wherein the mode for operating on a channel and timeslot is indicated in the three most significant bits (Source field ($b_9$–$b_7$)) of D-ARTS message 200. FIG. 4 is a block diagram that identifies how the three most significant bits is used in the D-ARTS message in accordance to some embodiments. A prefix (mode) provisioned in Source field ($b_9$–$b_7$) indicates how many of the remaining bits are used to indicate the coverage group number and the remaining bits are then used to identify a particular radio within the indicated coverage group.

In an embodiment, a mode indicated in Source field ($b_9$–$b_7$) need not be transmitted over the air, but may be provisioned into the radios. In another embodiment, the mode may be transmitted over the air to provide for error checking and to ensure all radios are using the same group size. If a radio detects a mismatch between the mode being used on the channel and its provisioned mode, it may not transmit its D-ARTS messages, as it would not know the fundamental group size and windowing structure in use.

Consider an example wherein a channel is configured to support two coverage groups, each with a maximum of sixty four radios, wherein Source IDs ($b_9$–$b_0$) 128 through 255 are used. Radio 0 in Group 0 will be configured to use Source ID=128, Radio 63 in Group 0 will be configured to use Source ID=191, Radio 0 in Group 1 will be configured to use Source ID=192, and Radio 63 in Group 1 will be configured to use Source ID=255. FIG. 5 is a block diagram that shows how identifier ranges are used in each group in accordance with some embodiments. Consider another example wherein a channel is configured to support four coverage groups, each with a maximum of thirty two radios, wherein Source IDs ($b_9$–$b_0$) 256 through 383 are used. As shown in FIG. 6, Radio 0 in Group 0 will be configured to use Source ID=256 and Radio 31 in Group 3 will be configured to use Source ID=383. In an embodiment, the Source ID/window number is computed as follows:

Window=(Mode×$2^7$)+(Group×$2^{(7-Mode)}$)+List Index where the mode is a prefix provisioned in Source field bits ($b_9$–$b_7$) that indicates how many of the remaining bits in the Source field are used to indicate the coverage group number.

By knowing a Source ID/window number, the mode/fundamental group size, coverage group, and a radio's assigned indexed position in the coverage group list can be derived. Note in the above equation, Mode multiplied by $2^7$ and Group multiplied by $2^{(7-Mode)}$ is shifting the Mode and Group fields into the proper bit position as shown in FIG. 4.

Figure 7A:
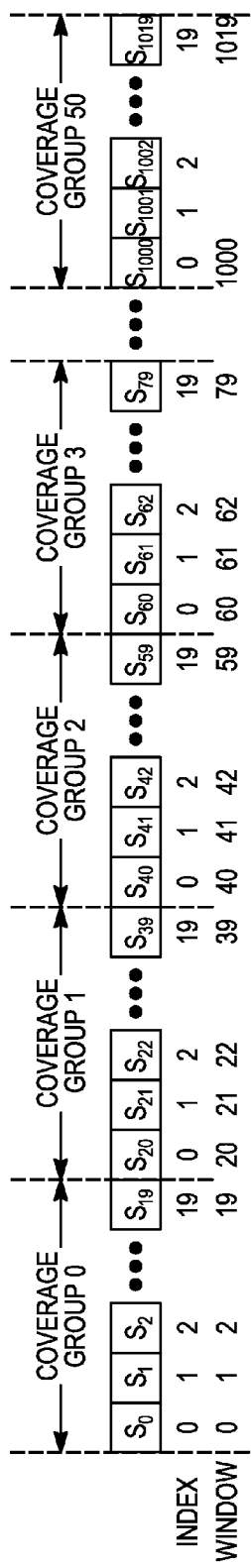
FIG. 7a is a diagram that corresponds to FIG. 3 and shows one method for assigning windows to each radio in a coverage group.

FIG. 7a is a diagram that corresponds to FIG. 3 and shows one method for assigning windows to each radio in a coverage group. As in FIG. 3, the fundamental group size is 20. In FIG. 7a, windows 0-19 are assigned to radios indexed at positions 0-19 in coverage group 0, windows 20-39 are assigned to radios indexed at positions 0-19 in coverage group 1, and so on.

Figure 7B:
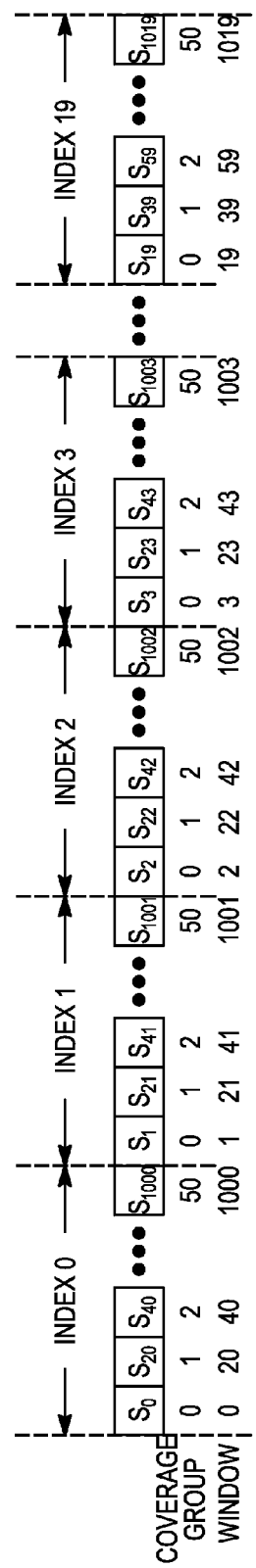
FIG. 7b is another diagram that corresponds to FIG. 3 and shows an alternate method for assigning windows to each radio in a coverage group.

FIG. 7b is a diagram that corresponds to FIG. 3 and shows an alternate method for assigning windows to each radio in a coverage group. As in FIG. 3, the fundamental group size is 20. In FIG. 7b, windows 0-19 are assigned to radios indexed at position 0 in each coverage group, windows 20-39 are assigned to radios indexed at position 1 in each coverage group, and so on.

Figure 8A:
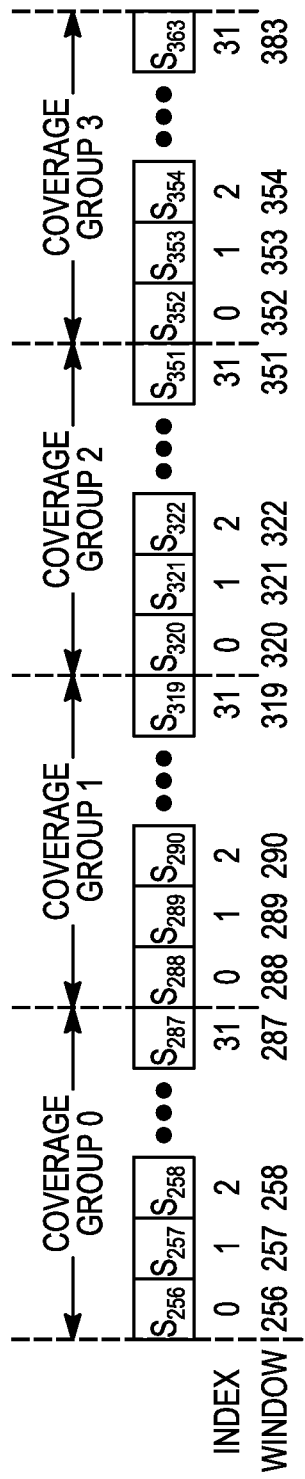
FIG. 8a is a diagram that corresponds to FIG. 6 and shows one method for assigning windows to each radio in a coverage group.

FIG. 8a is a diagram that corresponds to FIG. 6 and shows one method for assigning windows to each radio in a coverage group. As in FIG. 6, the channel is configured to support four coverage groups, each with a maximum of thirty two radios, wherein Source IDs ($b_9$–$b_0$) 256 through 383 are used. In FIG. 8a, windows 256-287 are assigned to radios indexed at positions 0-31 in coverage group 0, windows 288-319 are assigned to radios indexed at positions 0-31 in coverage group 1, and so on.

Figure 8B:
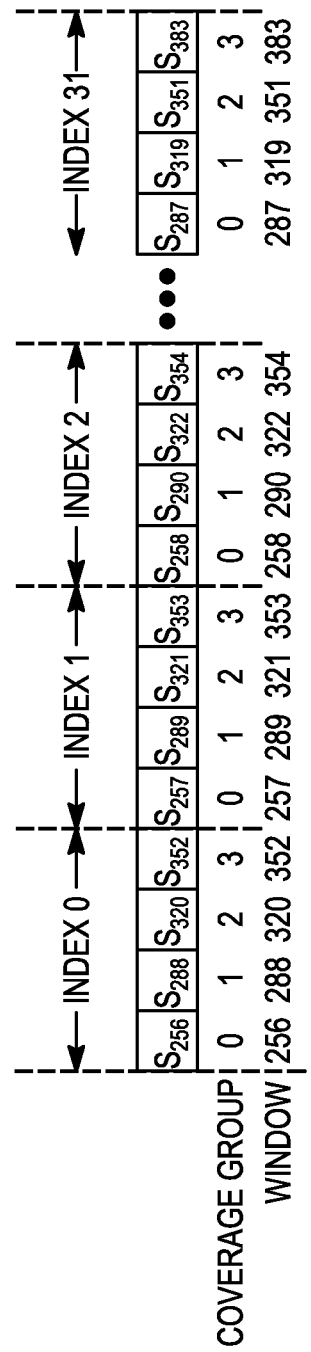
FIG. 8b is another diagram that corresponds to FIG. 6 and shows an alternate method for assigning windows to each radio in a coverage group.

FIG. 8b is a diagram that corresponds to FIG. 6 and shows an alternate method for assigning windows to each radio in a coverage group. As in FIG. 6, the channel is configured to support four coverage groups, each with a maximum of thirty two radios, wherein Source IDs ($b_9$–$b_0$) 256 through 383 are used. In FIG. 8b, windows 256-287 are assigned to radios indexed at position 0 in each coverage group, windows 288-319 are assigned to radios indexed at position 1 in each coverage group, and so on.

While providing the mode for operating on a channel and timeslot in the three most significant bits (Source field ($b_9$–$b_7$)) of D-ARTS message 200 is less flexible than allowing arbitrary group sizes, it does have the advantage that the 3-mode bits, if transmitted, may be used to confirm that radios are using the same fundamental group size.

For repeater based systems, in an embodiment, the repeater "kicks off" a polling event and at the end of the polling event the repeater reports the collected status to all radios on the channel. The polling event can either be for all radios on the system or could be for only members of a particular coverage group. Once the polling event is started, the repeater reserves the channel for responses to be returned in a windowed fashion. Battery saver preambles are eliminated from the D-ARTS responses and the repeater delay is not needed, so a D-ARTS transmission consumes only about sixty (60) msec of airtime. In an embodiment, this allows fifty (50) responses to be collected in 3 seconds. Because the repeater coordinates the polling events, the repeater can ensure proper spacing between polling events such that end users are able to use the system for their own transmissions.

Figure 9:
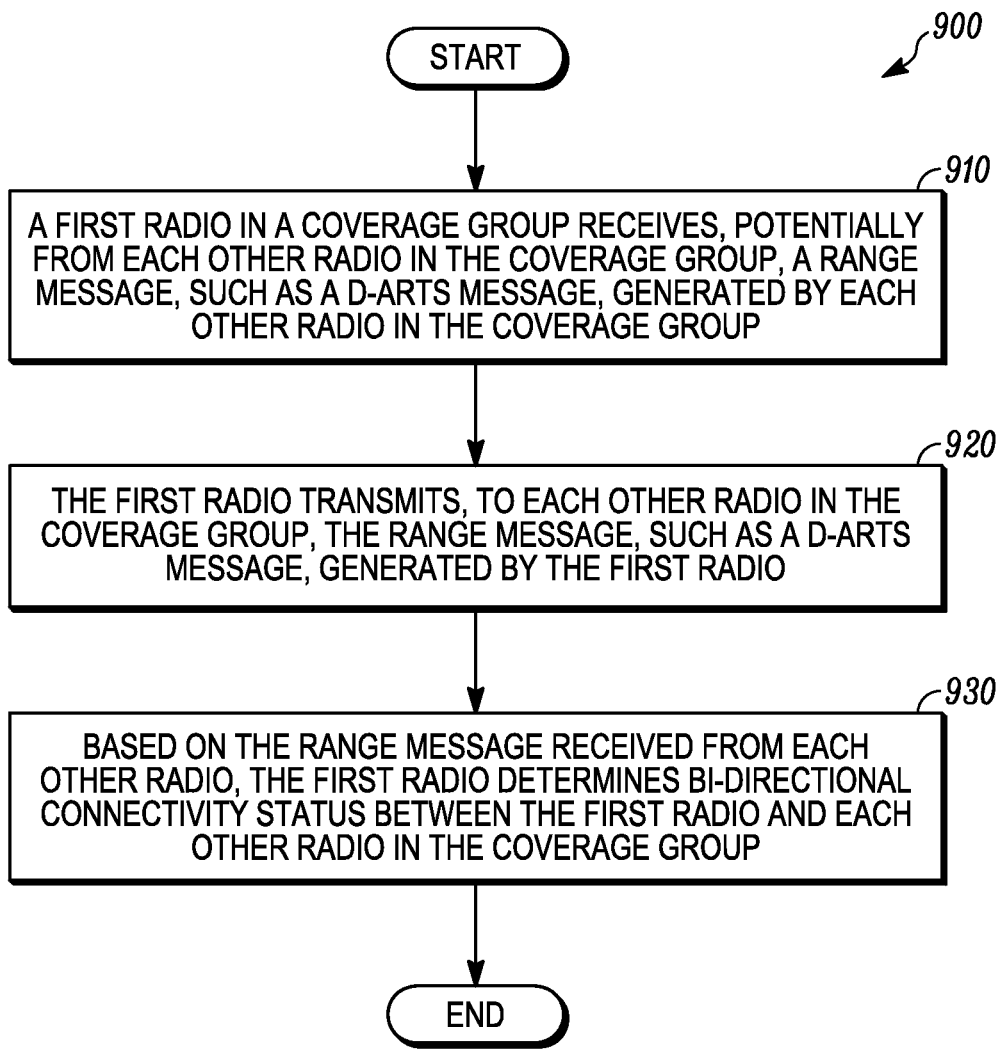
FIG. 9 is a flow diagram of a method for determining communication range information for radios in a coverage group.

FIG. 9 is a flow diagram of a method 900 for determining a connectivity status of radios in a coverage group. In 910, a first radio in the coverage group receives, potentially from each other radio in the coverage group, a range message, such as a D-ARTS message, generated by each other radio in the coverage group. In 920, the first radio transmits, to each other radio in the coverage group, the range message, such as a D-ARTS message, generated by the first radio. In 930, based on the range message received from each other radio, the first radio determines bi-directional connectivity status between the first radio and each other radio in the coverage group.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for determining a connectivity status of radios in a coverage group, wherein each coverage group includes radios configured to transmit and receive range messages on a channel and a timeslot, the method comprising:
   generating, by a radio in the coverage group, a generated range message comprising:
   a connection field for connecting multiple range messages; and
   a synchronization bit for facilitating startup of an exclusive transmission window sequence, wherein when the communicating radio knows that the generated range message is being transmitted in a proper window, the synchronization bit is set to a predefined value;
   transmitting, by the radio, the generated range message to each other radio in the coverage group;
   receiving, by the radio from each other radio in the coverage group, a received range message generated by each other radio, wherein the received range message from each other radio includes a bitmask field indicating whether the radio received a generated range message during a previous polling interval, thereby indicating the presence or absence of the each other radio in the coverage group; and
   based on the received range message received from each other radio, determining, by the radio, bi-directional connectivity status between the radio and each other radio in the coverage group, wherein the determined bi-directional connectivity status is between the radio and each of at least two other radios in the coverage group.

2. The method of claim 1, wherein the transmitting comprises computing a source identifier for each radio in each coverage group configured to operate on the channel and the timeslot using a fundamental group size assigned to at least one coverage group,
   wherein the source identifier is based on an indexed position of each radio in a coverage group list.

3. The method of claim 2, wherein each generated range message is transmitted during an exclusive transmission window assigned to each radio in the coverage group, wherein the exclusive transmission window assigned to each radio is determined based on a coverage group identifier and the source identifier.

4. The method of claim 1, further comprising identifying a mode for operating on the channel and the timeslot based on a predefined set of bits in the received range message.

5. The method of claim 4, wherein the mode in the predefined set of bits indicates how many bits of the received range message are used to identify a coverage group number and how many bits of the range message are used to identify a particular radio in the coverage group.

6. The method of claim 1, wherein the generated range message includes a source field for identifying the radio that generated the generated range message.

7. The method of claim 1, wherein the receiving comprises receiving a single received range message per polling interval from each other radio in the coverage group.

8. The method of claim 1, wherein each radio in the coverage group is provisioned with a coverage group list for identifying radios in the coverage group, wherein identified radios in the coverage group are those radios on a channel whose communications status each radio in the coverage group tracks.

9. The method of claim 1, further comprising providing, by the radio, an alert when another radio in the coverage group is determined by the radio to be out of communication range with the radio according to the bi-directional connectivity status between the radio and the other radio.

10. The method of claim 1, further comprising transmitting the generated range message from each radio in the coverage group to a repeater in response to a poll initiated by the repeater.

11. A communicating radio configured to determine a connectivity status of radios in a coverage group, the communicating radio comprises:
   a storing unit configured to store a coverage group list that identifies each other radio in the coverage group; and
   a transmission unit configured to transmit, to each other radio in the coverage group, a generated range message generated by the communicating radio, the generated range message comprising;
   a connection field for connecting multiple range messages; and
   a synchronization bit for facilitating startup of an exclusive transmission window sequence, wherein when the communicating radio knows that the generated range message is being transmitted in a proper window, the synchronization bit is set to a predefined value;
   a receiving unit configured to receive, from each other radio in the coverage group, a received range message generated by each other radio, wherein the received range message includes a bitmask field for indicating whether the receiving unit received a generated range message from the each other radio during a previous polling interval, thereby indicating a presence or absence status of the each other radio in the coverage group; and
   a determining unit configured to determine, based on the received range message received from each other radio, bi-directional connectivity status between the communicating radio and each other radio in the coverage group, wherein the determined bi-directional connectivity status is between the communicating radio and each of at least two other radios in the coverage group.

12. The communicating radio of claim 11, wherein during transmission of the generated range message, the communicating radio is configured to use a fundamental group size assigned to at least one coverage group that operates on a channel and a timeslot, and a source identifier computed for each radio in each coverage group based on an indexed position of each radio in a coverage group list.

13. The communicating radio of claim 12, wherein the generated range message transmitted during the exclusive transmission window is assigned to each radio in the coverage group, wherein the exclusive transmission window assigned to each radio is determined based on a coverage group identifier and the source identifier.

14. The communicating radio of claim 11, further configured to identify a mode for operating on a channel and a timeslot based on a predefined set of bits in the received range message, wherein the mode in the predefined set of bits indicates how many bits of the received range message are used to identify a coverage group number and how many bits of the range message are used to identify a particular radio in the coverage group.

15. The communicating radio of claim 11, wherein the generated range message generated by the communicating radio comprises:
 a source field for identifying the communicating radio.

16. The communicating radio of claim 11, wherein the transmitting unit is configured to transmit a single generated range message per polling interval.

17. The communicating radio of claim 11, wherein the transmitting unit is configured to transmit the generated range message to a repeater in response to a poll initiated by the repeater.

\* \* \* \* \*